Aug. 20, 1963   C. G. ROBINSON   3,101,385
METHOD AND MEANS FOR ELECTRIC MELTING
Filed April 11, 1960   2 Sheets-Sheet 1
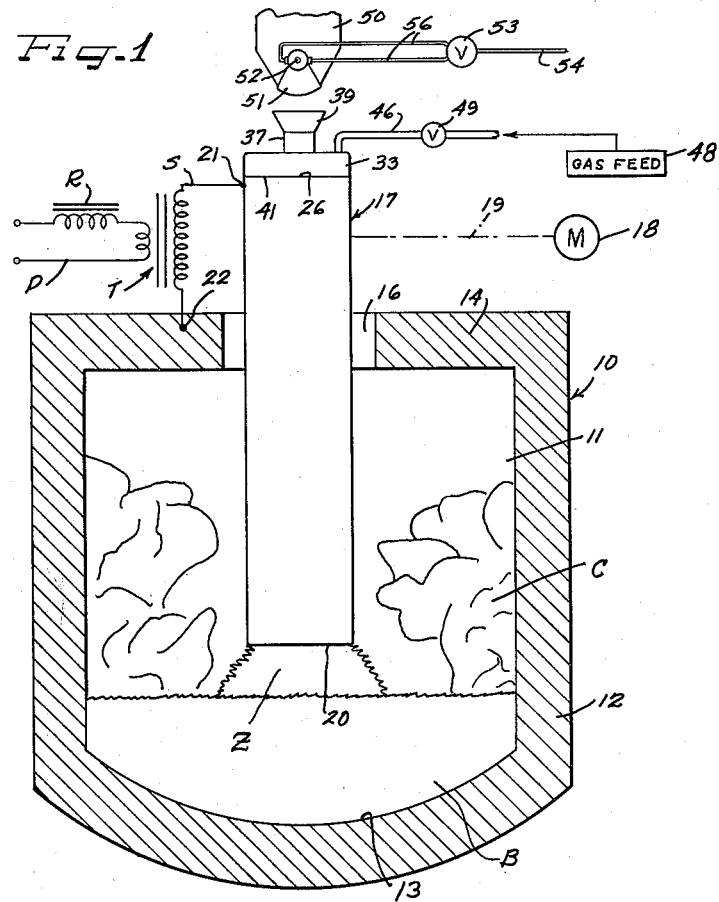
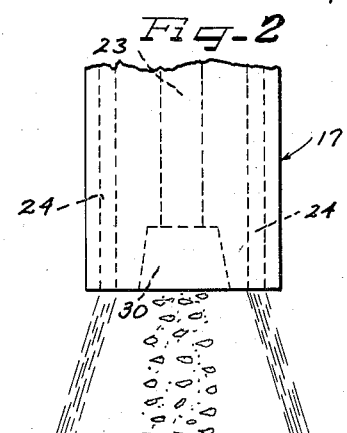
INVENTOR
*Charles G. Robinson*
BY
ATTORNEY Aug. 20, 1963 C. G. ROBINSON 3,101,385
METHOD AND MEANS FOR ELECTRIC MELTING
Filed April 11, 1960 2 Sheets-Sheet 2
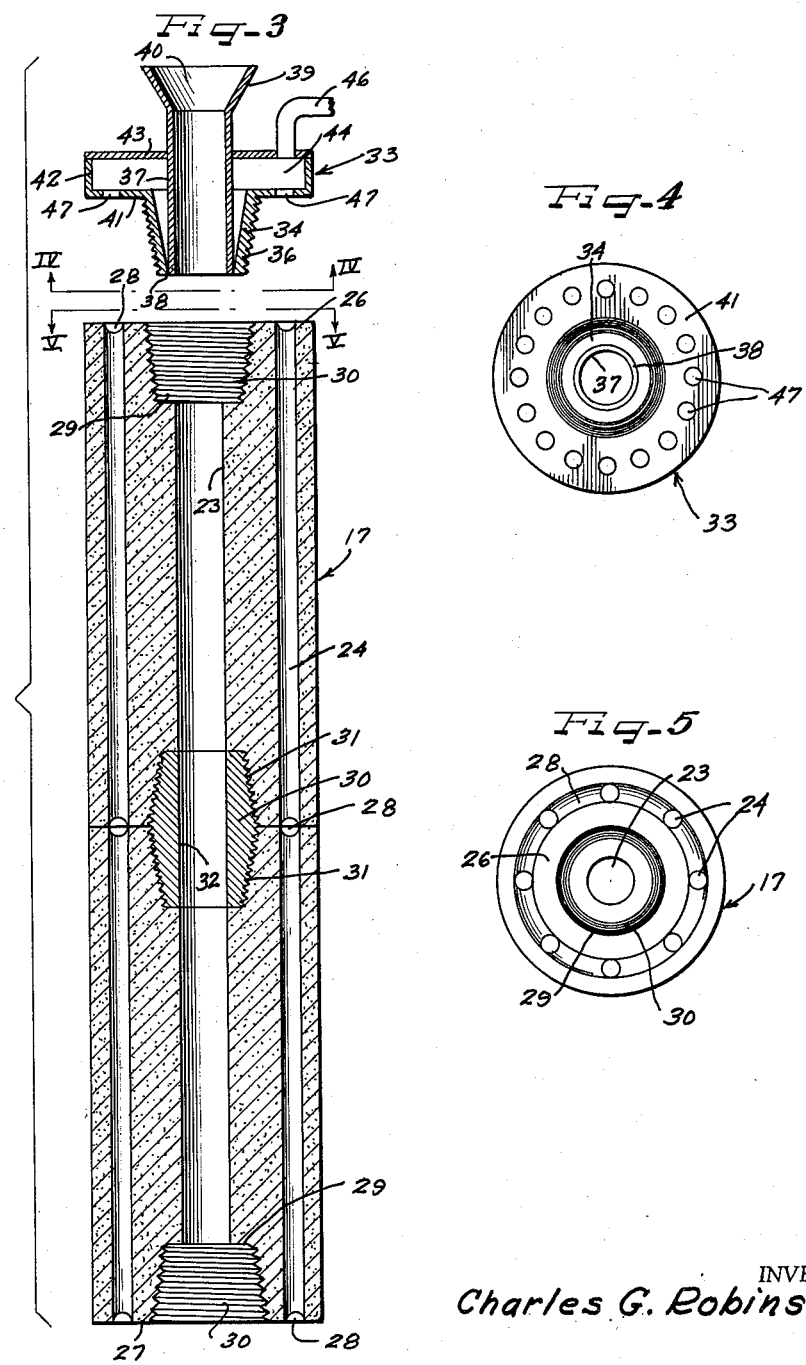
INVENTOR
Charles G. Robinson
BY
Hill, Sherman, Meroni, Gross & Simpson
ATTORNEY

United States Patent Office 3,101,385
Patented Aug. 20, 1963

3,101,385
METHOD AND MEANS FOR ELECTRIC MELTING
Charles G. Robinson, Sterling, Ill., assignor to Northwestern Steel and Wire Company, Sterling, Ill., a corporation of Illinois
Filed Apr. 11, 1960, Ser. No. 21,265
2 Claims. (Cl. 13—33)

This invention relates generally to methods and means involving improvements contemplated in electric melting furnaces of the so-called arc type.

This disclosure constitutes a continuation-in-part of my copending application Serial No. 3,589, filed January 20, 1960.

In past practice, electric melting furnaces have generally been charged through an opening in the so-called roof of the furnace, or through a charging door. By following such procedure, the meltable material which is sought to be injected into the furnace is required to be deposited on a layer of slag which covers the melt or bath of molten metal within the interior of the furnace. In following these practices, the loss through conversion is high as the slag restrains particularly the flow of lighter materials such as ore fines, from going into the melt or bath.

Artisans have, for many years, sought a satisfactory solution to this problem and in approaching the problem have produced various arrangements involving complicated mechanisms such as rotating kilns and other apparatus to attempt a direct feeding of the ore mix, or other meltable material into the furnace.

In accordance with the principles of the present invention, it is contemplated that an electrode column be provided with a continuous longitudinally extending passage therethrough of sufficient size to facilitate the injection of scrap, ore fines, or ore of any type and other meltable material therethrough. Thus, the meltable material is injected into the melt or bath directly through the arc zone. Since the force of the arc keeps the slag away from the arc zone, there is an unobstructed path from the bottom of the electrode column to the bath or melt through which the meltable materials may be passed. Moreover, the meltable materials are thus injected into the optimum temperature zone for fast reduction.

The passage means for injecting meltable material may either be used separately or in conjunction with the method and means disclosed in my acknowledged copending application wherein the high density arc zone is bombarded with gas molecules to substantially increase the temperature of the arc zone.

It is an object of the present invention, therefore, to provide a method and means of electric melting wherein meltable materials may be charged into the furnace without obstruction by slag or other objectionable impediments.

Another object of the present invention is to provide electric melting furnace apparatus wherein meltable material is injected into the furnace through a high temperature arc zone.

Yet another object of the present invention is to provide for use in an electric melting furnace an electrode having a continuous longitudinally extending passage formed therein through which meltable material may be injected into the furnace.

A still further object of the present invention is to provide for use in an electric melting furnace an electrode having continuous passage means extending longitudinally therethrough and which may be used to inject meltable material into the furnace through the arc zone and which may be further utilized to inject a monatomic gas from a source at increased pressure into the arc zone to increase the temperature of the arc zone.

Many other advantages, features and additional objects of the present invention will become manifest to those versed in the art upon making reference to the detailed description which follows and the exemplary form of the invention as described herein from which the methods of the present invention will be clearly understood.

On the drawings:

FIGURE 1 is a diagrammatic view of an arc-type melting furnace incorporating the principles of the present invention;

FIGURE 2 is a fragmentary end view of the electrode incorporated in the furnace of FIGURE 1 and illustrating the operation of the electrode of the present invention;

FIGURE 3 is an exploded view with parts shown in cross-section illustrating details of construction of the electrode column provided in accordance with the principles of the present invention and capable of practicing the methods contemplated;

FIGURE 4 is a bottom plan view taken on line IV—IV of FIGURE 3; and

FIGURE 5 is a top plan view taken on line V—V of FIGURE 3.

As shown on the drawings:

The general design of an arc-type furnace is that of any furnace construction conventionally provided and for that reason the furnace is herein shown in diagrammatic form only. The furnace is indicated generally at 10 and it will be understood that the furnace can conveniently comprise a heating chamber 11 provided, for example, by a steel bowl with a refractory lining such as is shown at 12. The furnace 10 has a hearth 13 which is a shallow bowl formed in the refractory of the bottom lining and is further shown as being provided with a roof 14 apertured as at 16 to form one or more ports through which vertical carbon or graphite electrodes travel.

An electrode is shown generally at 17 in FIGURE 1 and it will be understood that the electrode 17 may be carried on a winch and rope system, motor driven, or may be actuated by any other form of automatic electrode advancing mechanism such as is shown schematically by the motor indicated at 18 and having a mechanical connection 19 with the electrode 17.

The electrode 17 has a tip 20 which extends into the heating chamber 11 in proximity with components of a charge C. In reference to the charge C, it will be understood that the charging means forming the basis of the present disclosure may be used either independently or in conjunction with a conventional form of charging means which could include, for example, a door charge type or top charge type of access mechanism so that a charge of material including large pieces of scrap or other bulky forms of meltable material and which would be included in the charge C, may be injected into the heating chamber 11.

In order to draw and maintain an arc between the tip 20 of the electrode and the charge C, or the bath B, after the molten state is reached, electrical circuit means are provided. Thus, as shown in FIGURE 1, a transformer indicated generally at T has a primary circuit shown generally at P connected to the usual source of electrical energy. The secondary circuit S of the transformer T is connected to the electrode 17 as at 21 and to the furnace 10 as at 22. In order to give stability to the circuit and to limit the current when the electrode 17 makes contact with the charge C, a reactance R is included in the primary circuit of the transformer T.

In accordance with the principles of the present invention, the electrode 17 is particularly characterized by the formation therein of continuous passage means extending longitudinally therethrough. In the particular form of the invention illustrated herein, such passage means include inner and outer passages, the inner passage constituting a centrally disposed passage 23 and the outer passage means taking the form of an annular row of separate passages each indicated at 24 and being circumferentially spaced apart from one another, but disposed in generally concentric relation to the center passage 23.

The electrode 17 has an end face 26 at one end and an end face 27 at the opposite end, both of which end faces are intersected by the passages 23 and 24. Further, each face is characterized by the formation therein of a circumferentially continuous groove or recess 28 which intersects the various passages 24, thereby to intercommunicate the passages 24.

Each end face 26 and 27 is further characterized by a counterbore 29 formed in the end of the center passage 23 which counterbore may be tapered and provided with screw threads 30.

There is further provided a connecting pin shown generally at 30 and having oppositely tapered threaded portions shown at 31, which may be screw-threaded into the corresponding recesses 30, 30 formed in the adjoining faces 26 and 27 of axially adjacent electrode parts, as shown in FIGURE 3, thereby to couple the parts in assembly with one another. The connecting pin 30 is formed with an axial center passage 32 which is sized and shaped to form a unitary extension of the center passage 23 in each of the electrode parts.

Because of the annular recesses provided in the end faces 26 and 27, it will be appreciated that the outer passages 24 need not be in exact axial alignment, but will still permit the passages 24 to constitute an axially continuous flow path.

A cap member shown generally at 33 has an inner coupling part 34 screw-threaded as at 36 to cooperate with the screw threads 30 formed in an adjoining counterbore 29 at the top of the electrode column 17 and by means of which the cap member 33 is firmly assembled on the top of the electrode 17.

The cap member 33 includes a centrally disposed tubular wall 37 which opens at the bottom of the coupling portion 34 as at 38, thereby to form an inlet connection for one end of the center passage 23.

The tubular wall 37 has a billed top as at 39, thereby to form a hopper-like mouth 40 through which meltable material may be fed into the passage 23 without excess spillage.

Extending outwardly from the top of the coupling portion 34 is a bottom wall 41 which may be in the shape of a disk conforming in size and configuration to the adjoining face 26 of the electrode 17, thereby to facilitate a snug engaging fit with the adjoining end surface 26 when the cap member 33 is assembled to the electrode 17.

There is further provided an upstanding side wall 42 and a cover 43 extends across the side walls, thereby to form a manifold or chamber 44 having a conduit 46 connected thereto and forming an inlet through which a supply of monatomic gas may be supplied from a source at increased pressure.

The bottom wall 41 is provided with a plurality of circumferentially spaced openings 47, thereby to intercommunicate the chamber or manifold 44 with the recess 28 and hence all of the outer passage means 24.

The conduit 46 leads to a supply of gas at increased pressure shown at 48. The conduit 46 includes adjustable volume control means shown diagrammatically at 49 so that a metered supply of gas may be fed through the conduit 46 and into the passage means 24 of the electrode 17.

The physical characteristics of the arc drawn at the top 20 are such as to form a confined arc zone indicated by the letter Z in FIGURE 1. By feeding a monatomic gas such as hydrogen, helium, nitrogen or argon into the passages 24 and injecting the same into the arc zone Z, the collision of electrons with gas molecules produces a substantial increase in temperature of the arc zone Z, which makes the arc melting more efficient and which speeds melting rates. Thus, the high electron density converts the gas into plasma state and increases the tip temperature of the electrode. The reactance of the monatomic gas molecules in the arc zone of high electron density resulting in the consequent temperature increase of the arc zone may be referred to herein as the "plasma function."

In accordance with the principles of the present invention, there is provided superjacent the tubular member 37 a storage hopper shown generally at 50 and having a controllable outlet opening regulated by doors 51 actuated by motor 52 and regulated by a control means 53. For example, the motor 52 could constitute an air motor and the control means 53 is shown diagrammatically as constituting a control valve for regulating the flow of compressed air supplied through a supply conduit 54 to the motor conduits 56.

The storage hopper 50 is intended to hold a supply of scrap, or fines, additive ores for alloying purposes, or any other form of meltable material intended to be charged into the melting furnace 10. The center passage 23, of course, is made of sufficient size to facilitate the injection of the meltable material. Because the force of the arc keeps the slag away from the arc zone Z, there is provided an unobstructed path from the tip 20 to the melt or bath B facilitating the deposition of the meltable material into the bath B. Moreover, since the arc zone Z is the optimum center of high temperature, it will be appreciated that the additives supplied through the center passage 23 are directly reduced without any undesirable contact with the slag which generally covers the melt or bath B.

There is thus provided in accordance with the principles of the present invention, a method and means of continuously feeding meltable material into a direct arc furnace and under circumstances wherein the atmosphere in the immediate arc zone may be controlled. Moreover, such teachings are particularly useful not only for directly reducing ores such as iron ores, but also for injecting additive ores for alloying purposes. The principles disclosed herein not only combine a direct reduction technique, but also combine with such direct reduction the plasma techniques for increasing tip temperature and for producing arc stabilization.

Although minor modifications might be suggested by those versed in the art, it should be understood that I wish to embody within the scope of the patent warranted hereon, all such modifications as reasonably and properly come within the scope of my contribution to the art.

I claim as my invention:

1. The method of operating an electric melting furnace which includes the steps of
    generating an electric arc zone at an elevated temperature by energizing a circuit including the contents of the furnace and an electrode,
    injecting a stream of monatomic gas at increased pressure into the electric arc zone through the electrode so that the monatomic gas molecules collide with the electrons in the arc zone to substantially increase the temperature of the arc zone,
    and gravitationally injecting materials to be melted through said electrode independently of said stream of monatomic gas and into said arc zone.

2. An electric melting furnace comprising,
    an electrode construction including a generally cylindrical module having inner and outer longitudinal through passage means,
        the inner passage means comprising a centrally disposed axial passage,
        the outer passage means taking the form of an annular row of separate passages spaced apart from one another circumferentially and disposed in generally concentric relation to the axial passage, said module having opposite end faces each characterized by a circumferentially extending continuous groove intersecting and intercommunicating the outer passage means, each end face also having formed therein a tapered screw-threaded counterbore formed in the end of said axial passage, and a connecting pin having oppositely tapered externally threaded portions for screw-threaded coupling connection with an adjoining module spaced adjacent a corresponding end face, said connecting pin having an axial center passage formed therein sized and shaped to form a unitary extension of said axial inner passage means, means for injecting a supply of monatomic gas at increased pressure into said outer longitudinal passages, whereby the gas molecules exiting from the end of the module will collide with the electrons in the arc zone to substantially increase the temperature of the arc zone, and means for gravitationally injecting material to be melted into said inner passage means for delivery through said axial passage into the arc zone at increased temperature.

References Cited in the file of this patent

UNITED STATES PATENTS

| | | |
|---|---|---|
| 815,016 | Heroult | Mar. 13, 1906 |
| 941,768 | Dieffenbach et al. | Nov. 30, 1909 |
| 1,193,783 | Hillhouse | Aug. 8, 1916 |
| 1,492,038 | Leonarz | Apr. 29, 1924 |
| 2,527,294 | Bailey | Oct. 24, 1950 |
| 2,862,748 | Bailey et al. | Dec. 2, 1958 |
| 2,922,869 | Giannini et al. | Jan. 26, 1960 |
| 2,970,854 | Johbson | Feb. 7, 1961 |
| 2,990,466 | Cresswell | June 27, 1961 |

FOREIGN PATENTS

| | | |
|---|---|---|
| 778,785 | Great Britain | July 10, 1957 |